Oct. 10, 1950     J. BORZELL ET AL     2,524,955

AUTOMOBILE SUPPORT

Filed Oct. 22, 1948

John Borzell
Angelo Borzell
INVENTORS

BY *C.A. Snow & Co.*
ATTORNEYS.

Patented Oct. 10, 1950

2,524,955

UNITED STATES PATENT OFFICE 2,524,955

AUTOMOBILE SUPPORT

John Borzell and Angelo Borzell, Pittston, Pa.

Application October 22, 1948, Serial No. 55,976

2 Claims. (Cl. 248—163)

This invention relates to an automobile support designed primarily for use by mechanics in supporting an automobile in elevated position so that work to be done on the under portion or running gear of the car directly under the car, can be accomplished with facility.

An important object of the invention is to provide a device of this character which will contact with the wheels of the vehicle supporting the weight of the car through the wheels and not from the axle of the car as is common practice, thereby leaving a wide area for the operator to work without interference by the supporting means used in supporting the car or vehicle.

A still further object of the invention is to provide a support of this character which is adjustable or extensible so that the degree of elevation for accomplishing a particular work, may be adjusted.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 1:
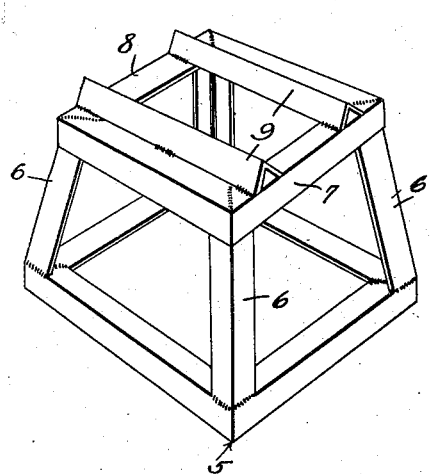
Figure 1 is a perspective view illustrating a portable support, constructed in accordance with the invention.
Figure 2:
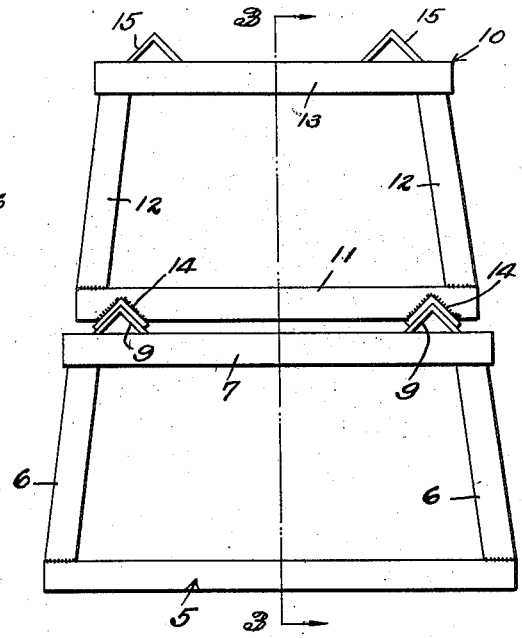
Fig. 2 is a side elevational view illustrating the manner of engaging a pair of supporting members in increasing the height of the stand or support to better adapt the stand for a particular work.
Figure 3:
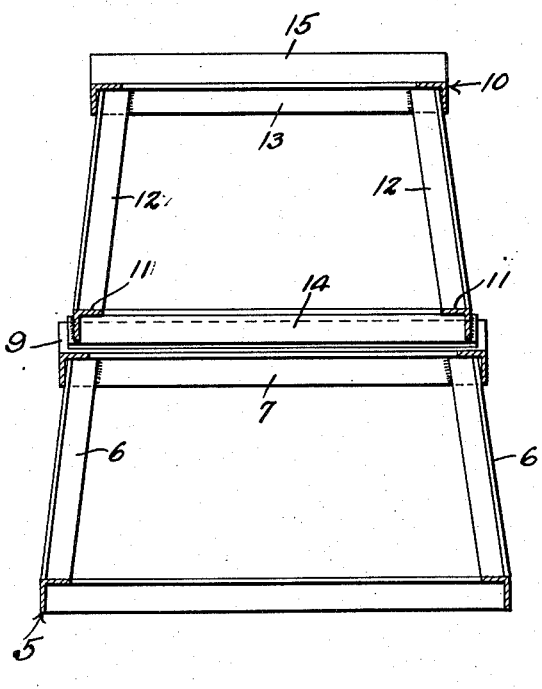
Fig. 3 is a sectional view taken on line 3—3 of Fig. 2.

Referring to the drawing in detail, the support comprises a body portion including a rectangular frame 5 which is constructed preferably of angle bar material with the open side of the material or bars disposed inwardly.

Rising from the corners of the rectangular frame or base 5, are uprights 6 which are also constructed of angle bar material with the open sides thereof disposed inwardly. These bars 6 are shown as inclined inwardly towards the upper ends thereof, where they are fitted within the rectangular frame 7 formed of angle bar material, the ends of the bars 6 being welded to the frames 5 and 7.

As clearly shown by the drawing, the rectangular frame 7 has its open side disposed downwardly providing horizontal upper flanges 8 that provide a support for the wheel-engaging angle bars 9, which angle bars have their open sides disposed towards the frame 7, where they are welded to the frame. These angle bars 9 are so arranged with respect to each other that they form a saddle or support for the wheel of the vehicle positioned therein, to hold the wheel against displacement, under normal conditions.

It will of course be understood that the wheel positioned on the support, engages the angle bars 9 at right angles with respect to the inclined surfaces thereof.

The support also includes an upper section indicated generally by the reference character 10, the upper section including a lower rectangular frame 11 constructed of angle bar material, and corner bars 12 rising therefrom, the corner bars 12 being inclined towards their upper ends and welded to the open side of the upper rectangular frame 13.

Extending transversely of the lower rectangular frame 11, are angle bars 14 which have their open sides disposed downwardly, the angle bars 14 being so arranged that they will fit directly over the angle bars 9 of the adjacent lower section, securing the sections together against movement with respect to each other.

On the upper surfaces of the upper rectangular frame 13, are angle bars 15 that provide stops, the angle bars being arranged with their open sides disposed downwardly where they are welded to the rectangular frame 13.

While I have shown and described a base section and upper section, it is to be understood that the support may embody several sections if desired, so that greater heights may be obtained for supporting various types of motor vehicles and to provide ample space under a vehicle for a mechanic to work.

It will be seen that because of the construction of the support, the motor vehicle wheels are held between the stops or angle bars 9 and 15, and will be firmly held against displacement, and because of the construction of the support, the support will be firmly held on the supporting surface without danger of the same toppling over to injure the mechanic working under the vehicle.

In the use of the device, the vehicle to be elevated, is jacked up in the usual and well known manner, and when it has been elevated to the proper position, a support such as described is positioned under a wheel, or both wheels of the vehicle, thereby steadying the vehicle, holding the vehicle against movement while repairs or adjustments are being made from a point under the vehicle.

Having thus described the invention, what is claimed is:

1. In a vehicle support, a body portion including a lower frame member and an upper frame member, upwardly extended corner bars secured to the frame members holding the frame members in spaced relation with respect to each other, spaced angle bars horizontally disposed and secured across the upper surface of the upper frame member with their open sides disposed downwardly, providing stops having inclined surfaces between which a wheel positioned on the support is held.

2. In a vehicle support, a base section and an upper movable section, spaced angle bars secured to the upper surfaces of the sections, the open sides of said angle bars being disposed downwardly presenting inclined upper surfaces against which a wheel supported thereby is held, spaced angle bars secured to the lower surface of the upper section, the open sides of the latter angle bars being disposed downwardly and fitted over the angle bars of the base section, removably securing the sections together, and elevating the support.

JOHN BORZELL.
ANGELO BORZELL.

REFERENCES CITED

The following references are of record in the file of this patent:

UNITED STATES PATENTS

| Number | Name | Date |
|---|---|---|
| 1,603,742 | Broderick | Oct. 19, 1926 |
| 1,737,821 | Anderson | Dec. 3, 1929 |
| 1,820,103 | Toy | Aug. 25, 1931 |